United States Patent [19]
Terajima

[11] Patent Number: 5,386,726
[45] Date of Patent: Feb. 7, 1995

[54] VIBRATORY GYROSCOPE

[75] Inventor: Kokichi Terajima, Tokyo, Japan

[73] Assignee: Akai Electric Co., Ltd., Tokyo, Japan

[21] Appl. No.: 591,693

[22] Filed: Oct. 2, 1990

[30] Foreign Application Priority Data

Oct. 3, 1989 [JP] Japan .................. 1-256946
Oct. 19, 1989 [JP] Japan .................. 1-270366

[51] Int. Cl.⁶ .................................. G01P 9/04
[52] U.S. Cl. ........................... 73/505; 310/329
[58] Field of Search .............. 73/505; 310/329, 370

[56] References Cited
U.S. PATENT DOCUMENTS

| | | | |
|---|---|---|---|
| 2,513,340 | 7/1950 | Lyman | 73/505 |
| 3,219,850 | 11/1965 | Langevin | 73/505 |
| 3,241,377 | 3/1966 | Newton | 73/505 |
| 3,839,915 | 10/1974 | Schlitt | 73/505 |
| 4,538,461 | 9/1985 | Juptner et al. | 73/505 |
| 4,703,655 | 11/1987 | Konuo et al. | 73/505 |
| 4,836,023 | 6/1989 | Oikawa | 73/505 |

FOREIGN PATENT DOCUMENTS

| | | |
|---|---|---|
| 0298511 | 1/1989 | European Pat. Off. . |
| 59-170717 | 9/1984 | Japan . |
| 2-129514 | 5/1990 | Japan . |

OTHER PUBLICATIONS

"Fundamentals of the Vibratory Rate Gyro", J. B. Chatterton, ASME Jan. 1956, pp. 123–125.
"Piezoelectric Vibratory Gyroscopes", M. Konno, pp. 53–60.
"Mechanical Channel Filter Using a Torque Transducer of Temperature Compensation Type", T. Hayashi, Mar. 1980, p. 64.

Primary Examiner—John E. Chapman
Attorney, Agent, or Firm—Marmorek, Guttman & Rubenstein

[57] ABSTRACT

A vibratory gyroscope comprises, with respect to an XYZ coordinate system, a tuning fork having two arm members extending from a base member in the direction of the Z-axis, a support member extending from the base member in the direction of the Z-axis, and a pickup member which senses a Coriolis force acting on the two arm members when they are caused to vibrate. The pickup member includes a layer of piezoelectric material polarized in the direction of the Z-axis and at least one pair of electrodes disposed on surfaces of the support member which are in parallel to the Z-axis. At least one of the electrodes is positioned to one side of a center line on its respective surface, the center line being parallel to the Z-axis. In one embodiment, the pickup member itself constitutes the support member of the tuning fork. In another embodiment, the pickup member is a separate unit which is affixed to a surface of the support member of the tuning fork.

25 Claims, 6 Drawing Sheets

VIBRATORY GYROSCOPE

BACKGROUND OF THE INVENTION

The present invention relates to an improved vibratory gyroscope which senses a Coriolis Force for the purpose of detecting angular velocity.

Figure 13:
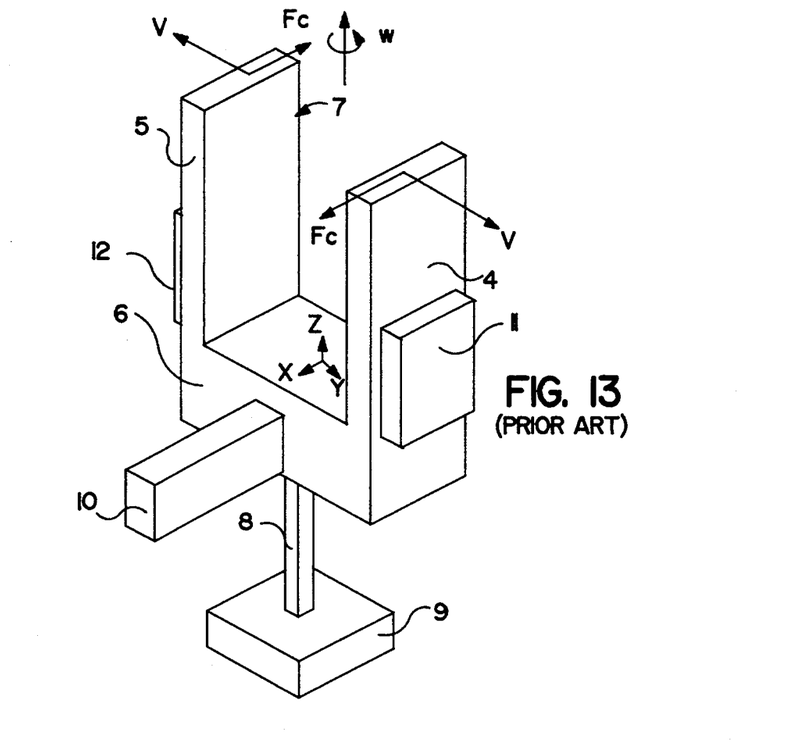
FIG. 13 is a perspective view of an example of a vibratory gyroscope according to the prior art.

FIG. 13 illustrates an example of a conventional vibratory gyroscope in an XYZ coordinate system.

This kind of gyroscope provides a metal tuning fork 7 fixed on a base plate 9 through a support member 8, and a pickup member 10 extending from the base member 6 in the direction of the X-axis. The tuning fork is monolithically or integrally formed from a base member 6 and two arm members 4 and 5, with the two arm members 4 and 5 extending in parallel in the direction of the Z-axis and being separated by a certain distance in the direction of the Y-axis and abutting the base member 6 at each lower end.

In the above vibratory gyroscope, it is known that a Coriolis Force $F_c$ is exerted on each arm member 4 and 5 which acts in mutually opposite directions along the X-axis, when the arm members 4 and 5 are symmetrically vibrated with speed V in the direction of the Y-axis by means of piezoelectric or magnetic elements, e.g., by applying alternating currents to piezoelectric ceramics 11 and 12, at the same time that the tuning fork 7 is caused to rotate about the Z-axis with the angular velocity $\omega$.

Since the speed V of the arm members 4 and 5 changes alternately, the generated Coriolis Force is modulated by the vibrations of the arm members 4 and 5. The tuning fork 7 torsionally vibrates about the Z-axis with respect to the base plate 9, the torsion angle being proportional to the velocity $\omega$.

This conventional device detacts the magnitude of torsional vibration through piezoelectric or magnetic elements, using the pickup member 10 extending in the direction of the X-axis. For example, in case of detection by piezoelectric elements, the torsional vibration of the tuning fork 7 is developed as a flexural vibration in the pickup member 10, and bimorph elements on the pickup member 10 produce electric charges according to the magnitude of the flexure, which electric charges are measured as electric voltage.

However, in such a prior art system, there is a possibility that vibration of the arm members 4 and 5 produces undesired vibration of the base member 6 in the direction of the Y-axis due to an imbalance in the weight and length of the two arm members 4 and 5, thereby causing the pickup member 10 to generate undesired detection signals including offsets, which offsets appear as if a Coriolis Force is detected in spite of the fact that the angular velocity is zero, and also lower the signal to noise ratio of the detection signals and the detection sensitivity of the gyroscope system as a whole.

In accordance with a conventional method for reducing such offsets, measurement of the offset signal level is carried out before operation of the gyroscope system, and the detacted signal level during the operation of the gyroscope system is then subject to correction based upon the measured offset signal level. More specifically, before application of angular velocity to the gyroscope system, the output signals of the pickup member 10 are detected by a synchronous detector and then rectified to direct currents by a rectifier. Since the level of such direct currents represents the offset level, the baseline level of the detection signals is changed based upon the level of such direct currents so that the offsets may be cancelled. However, it has been substantially unavoidable for such prior methods to reduce the offsets sufficiently and effectively because the sensitivity of the pickup member 10 fluctuates slightly depending upon the temperature of the location where the gyroscope is placed.

Additionally, according to the prior art, providing a pickup member which extends in the direction of the X-axis has inherent drawbacks due to its complexity of construction, large size, and cost to produce.

Accordingly, a principal object of the present invention is to provide a new vibratory gyroscope with improved performance in detection sensitivity.

A further object of the present invention is to provide a new vibratory gyroscope with reduced size and simplified construction.

A further object of the present invention is to provide a new vibratory gyroscope with reduced offsets in its output signal.

A further object of the present invention is to provide a new vibratory gyroscope with improved signal to noise ratio in its output signal.

A further object of the present invention is to provide a new vibratory gyroscope with improved manufacturing efficiency.

A further object of the present invention is to provide a new vibratory gyroscope with improved manufacturing processing.

A further object of the present invention is to provide a new vibratory gyroscope with reduced manufacturing costs.

A further object of the present invention is to provide a new vibratory gyroscope with greater tolerance in the size and weight of the arm members of a tuning fork.

SUMMARY OF THE INVENTION

These and other objects are accomplished by means of the present invention which provides a vibratory gyroscope system comprising, with respect to an XYZ coordinate system, a tuning fork having two arms and a base member. The two arm members extend in parallel along the Z-axis and are separated from each other by a predetermined distance along the Y-axis by the base member. A support member extends from the base member in the direction of the Z-axis, and a pickup member is associated with the support member and is capable of detecting the Coriolis Force acting on the arm members when they are caused to vibrate. The pickup member includes piezoelectric material polarized in the direction of the Z-axis and at least one pair of electrodes. The electrodes are disposed on surfaces of the pickup member, preferably opposing surfaces of the pickup member, which surfaces are parallel to the Z-axis. At least one of the pair of electrodes is disposed off-center on its surface, so that it is to one side of a vertical center line of that surface.

In a first embodiment, the pickup member itself constitutes the support member for the tuning fork.

In a second embodiment, the pickup member is an independent unit which is affixed to a surface of the support member for detecting the net torque or torsional moment exerted on the support member by the Coriolis Force on the arm members.

DETAILED DESCRIPTION OF PREFERRED EMBODIMENTS

In the Figures in this specification, identical reference numerals are used with respect to portions which are similar to those in the prior art shown in FIG. 13.

Figure 1:
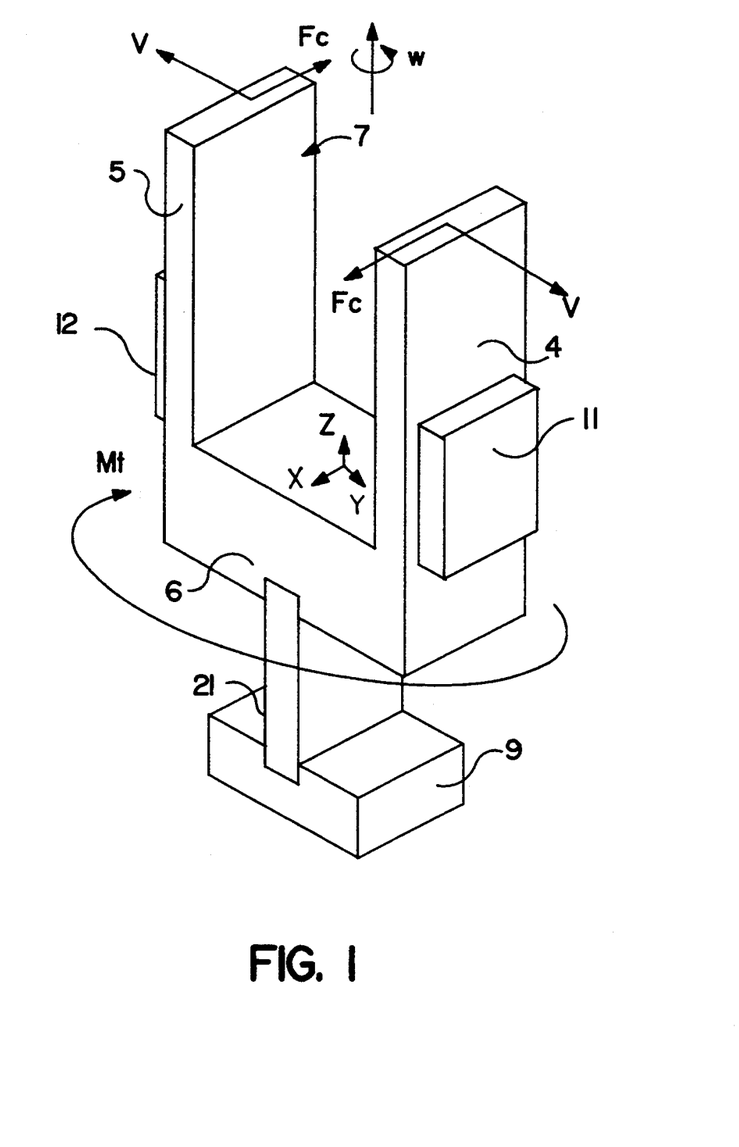
FIG. 1 is a perspective view of a first embodiment of a vibratory gyroscope according to the present invention.

Referring first to FIG. 1, the inventive vibratory gyroscope comprises a tuning fork 7 which consists of two arm members 4 and 5, and a base member 6, in which the arm members 4 and 5 extend in parallel in the direction of the Z-axis and are separated by a certain distance by the base member 6 in the direction of the Y-axis. Each lower end of the arm members 4 and 5 is monolithically joined to the base member 6. From the lower surface of the base member 6, a pickup member 21 extends with its end being fixed to the base plate 9.

The thus-constructed vibratory gyroscope has an advantage in that the pickup member 21 also serves as a support member corresponding to the support member 8 of the prior art example shown in FIG. 13. The pickup member 21 detects the net torque or torsional moment $M_t$ arising from the Coriolis Force $F_c$ acting on each of the arm members 4 and 5 when they are set into vibration. This construction not only simplifies the manufacture and structure of the vibratory gyroscope, but also reduces the size and the cost thereof. Furthermore, the gyroscope according to the present invention effectively prevents undesired vibration in the direction of the Y-axis due to an imbalance in the weight or length of the two arm members from influencing the detection signal, thereby improving detection sensitivity, since the pickup member 21 detects the net torque $M_t$ arising from Coriolis Force $F_c$.

Figure 2:
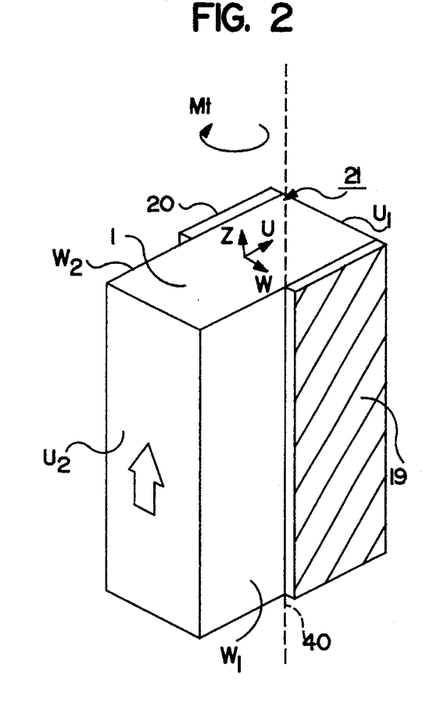
FIG. 2 is an illustration of a first embodiment of a pickup member for use in the vibratory gyroscope shown in FIG. 1.

FIG. 2 illustrates in detail the pickup member 21 in a UWZ coordinate system. In order to detect the net torque $M_t$, the pickup member 21 is made from a piezoelectric material polarized in the direction of the Z-axis (as shown by the arrow), with the electrodes 19 and 20 respectively being provided on the surfaces $w_1$ and $w_2$ perpendicular to the W-axis. The electrodes 19 and 20 are positioned on their corresponding surfaces $w_1$ and $w_2$ asymmetrically with respect to an imaginary center line 40 in the surface that is parallel to the Z-axis. For example, each electrode 19, 20 may be located alongside to a surface $u_1$, perpendicular to U-axis. With this construction, it is possible to detect an electric displacement $D_u$ in the direction of the W-axis within the region between the electrodes 19 and 20 arising from the net torque $M_t$.

In the example shown in FIG. 2, the two electrodes 19 and 20 alternatively may be positioned alongside the surface $u_2$, or one of the electrodes 19 and 20 may be formed along the entire surface of $w_1$ or $w_2$.

Figure 3:
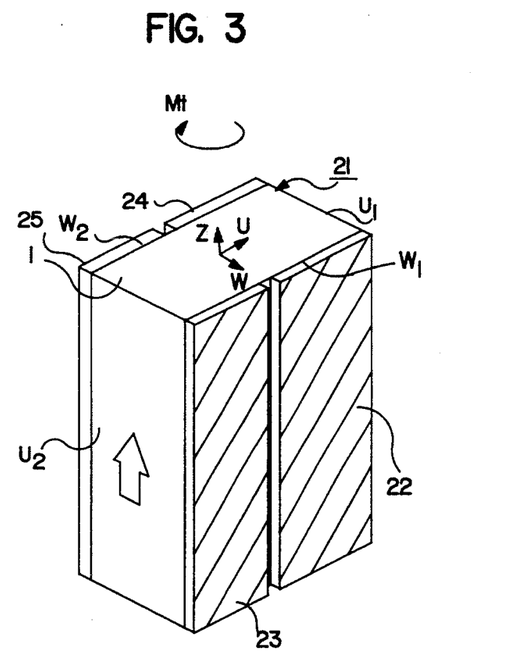
FIG. 3 is an illustration of a second embodiment of a pickup member for use in the vibratory gyroscope shown in FIG. 1.

In the embodiment shown in FIG. 3, the pickup member 21 provides electrodes 22, 23, 24, 25 on the surfaces $w_1$, $w_2$, the two electrodes 22 and 24 being positioned alongside to the surface $u_1$ and the two electrodes 23 and 25 being positioned alongside to the surface $u_2$, respectively. In this embodiment, the pair of electrodes 22 and 25 produces electric charges with mutually opposite polarity to the electric charges produced in the pair of electrodes 23 and 24, in response to the application of torque $M_t$.

The electrodes shown in FIGS. 2 and 3 can be formed through a vacuum deposition process or through a chemical plating process which forms conductive layers on the piezoelectric material, and a following photoetching process. The electrodes may also be formed by other methods used in the manufacture of semiconductor devices, such as by a lift-off method.

Figure 4:
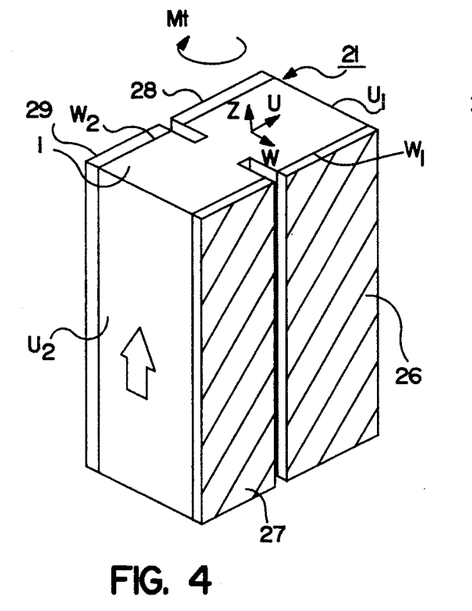
FIG. 4 is an illustration of a third embodiment of a pickup member for use in the vibratory gyroscope shown in FIG. 1.

In the pickup member 21 shown in FIG. 4, electrodes formed on the entire surfaces $w_1$ and $w_2$ are divided into four electrodes 26, 27, 28 and 29 by forming a groove in the direction of the Z-axis, of a certain depth approximately in the center of the respective surfaces $w_1$ and $w_2$ through a precision cutter or a similar machine. The pair of electrodes 26 and 29 produces electric charges with mutually opposite polarity to charges produced in the pair of electrodes 27 and 28, in response to the application of the net torque $M_t$. In this embodiment, manufacture of the pickup member 21 is simplified because the cutting of the piezolectric material is carried out simultaneously with the division process of the electrodes.

Figure 5:
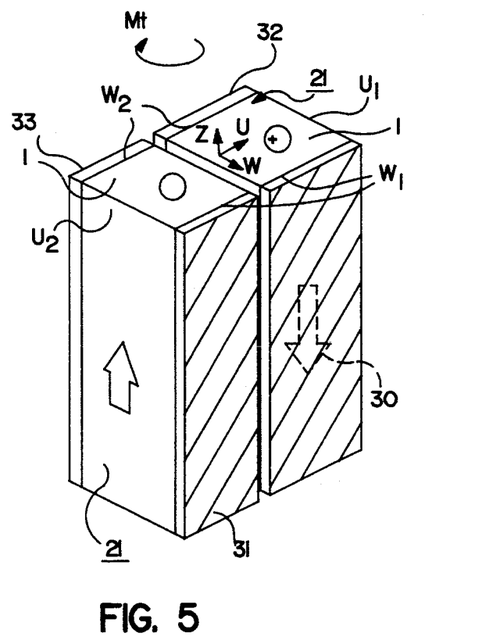
FIG. 5 is an illustration of a fourth embodiment of a pickup member for use in the vibratory gyroscope shown in FIG. 1.

The pickup member 21 shown in FIG. 5 consists of two pieces of the piezoelectric material 1, which are polarized in mutually opposite directions (as shown by the arrows) and are positioned in parallel in the direction of the U-axis at a certain distance from each other. The electrodes 30 and 31 are provided on the surface $w_1$ and the electrodes 32 and 33 are provided on the surface $w_2$, respectively. In response to the application of the net torque $M_t$ to this structure, the electrodes 30 and 31 on the surface $w_1$ generate electric charges with the same polarity, and the electrodes 32 and 33 generate electric charges with reversed polarity with respect to the electrodes 30 and 31.

Since, in this structure, two neighboring electrodes generate electric charges with the same polarity, lead wires to be fixed to each electrode do not cross each other and the assembly of the gyroscope is simplified.

Although all of the above-described examples with the electrodes 19 and 20 on the surfaces $w_1$ and $w_2$ are constituted to detect the electric displacement $D_u$, detection of the electric displacement $D_w$ in the direction of the U-axis is also possible by forming electrodes on the surfaces $u_1$ and $u_2$ in the same manner as mentioned before.

When one of the pickup members of FIGS. 2 to 5 is employed in the gyroscope shown in FIG. 1, the direction of the Z-axis in the tuning fork shown in FIG. 1 coincides with the direction of the Z-axis of the pickup member 21, shown in FIGS. 2 to 5. However, the directions of the X-axis and the Y-axis in the XYZ coordinate system of FIG. 1 do not necessarily coincide with the directions of the U-axis and the W-axis in the UWZ coordinate system of FIGS. 2 to 5.

To clarify the general principles on which the pickup member 21 operates, reference is now made to FIGS. 14 to 17.

Figure 14:
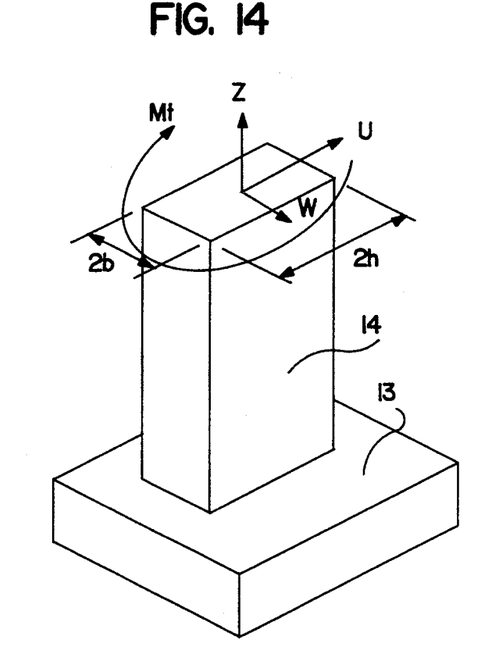
FIGS. 14 through 17 are diagrammatic illustrations explaining the principles and operation of the present invention.

FIG. 14 illustrates a column-like member 14, which extends from a fixed plate 13 in the direction of the Z-axis and is shaped as a rectangular parallelepiped. Assuming that the sectional size of the member 14 is $2b \times 2h$, the shearing stress $\tau_w$ with respect to the U-axis and $\tau_u$ with respect to the W-axis at an arbitrary point $P(u,w)$ are given as follows:

$$\tau_w = \frac{9}{16} \cdot \frac{M_t}{b^2 h} \cdot \frac{1}{b} \left[1 - \left(\frac{u}{h}\right)^2\right] w \quad (1)$$

$$\tau_u = \frac{9}{16} \cdot \frac{M_t}{b^2 h} \cdot \frac{b}{h^2} \left[1 - \left(\frac{w}{h}\right)^3\right] u \quad (2)$$

When stress T and electric field E are applied to piezoelectric material, the electric displacement D produced therein is generally expressed by the following equation:

$$\begin{bmatrix} D_1 \\ D_2 \\ D_3 \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{bmatrix} \begin{bmatrix} T_1 \\ T_2 \\ T_3 \\ T_4 \\ T_5 \\ T_6 \end{bmatrix} + \quad (3)$$

$$\begin{bmatrix} \epsilon_{11} & \epsilon_{12} & \epsilon_{13} \\ \epsilon_{21} & \epsilon_{22} & \epsilon_{23} \\ \epsilon_{31} & \epsilon_{32} & \epsilon_{33} \end{bmatrix} \begin{bmatrix} E_1 \\ E_2 \\ E_3 \end{bmatrix}$$

wherein $d_{11}$–$d_{36}$ and $\epsilon_{11}$–$\epsilon_{33}$ represent piezoelectric constants and dielectric constants, respectively.

Figure 16:
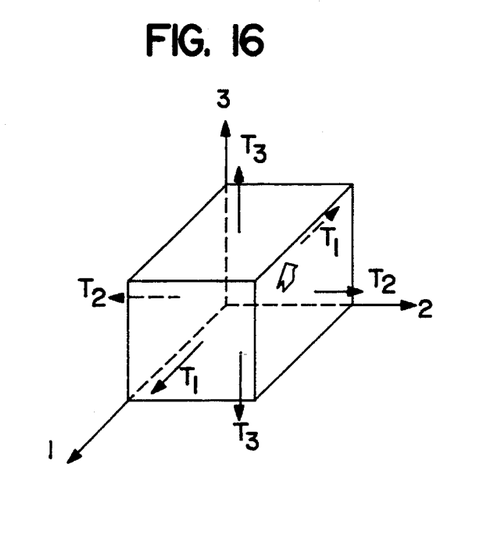
Figure 17:
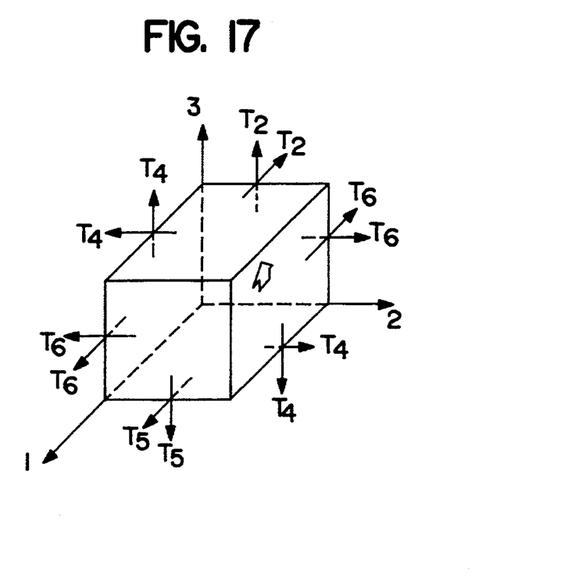

When a piezoelectric material such as lead zirconate titanate, a known piezoelectric ceramic material, is used and only stress T is applied thereto, the above equation can be expressed as follows:

$$\begin{bmatrix} D_1 \\ D_2 \\ D_3 \end{bmatrix} = \begin{bmatrix} 0 & 0 & 0 & 0 & d_{15} & 0 \\ 0 & 0 & 0 & d_{15} & 0 & 0 \\ d_{31} & d_{32} & d_{33} & 0 & 0 & 0 \end{bmatrix} \begin{bmatrix} T_1 \\ T_2 \\ T_3 \\ T_4 \\ T_5 \\ T_6 \end{bmatrix} \quad (4)$$

wherein the tensile stress components $T_1$–$T_3$ are applied in the directions shown in FIG. 16 and the shear stress components $T_4$–$T_6$ are applied in the directions shown in FIG. 17, the piezoelectric material being polarized in the direction of the 3-axis as shown by the arrow.

The above equation means that the electric displacement $D_1$ in the direction of the 1-axis is given as:

$$D_1 = d_{15} T_5 \quad (5)$$

when an electrode is provided on a surface perpendicular to the 1-axis. This means that the column-like member 14 operates as a pickup member generating electric charges with respect to $T_5$, the shearing stress about the 1-axis, only and would have no sensitivity with respect to stress $T_1$, $T_2$, $T_3$, $T_4$, and $T_6$ from other directions.

Accordingly, assuming that the column-like member 14 shown in the FIG. 14 is a piezoelectric material polarized in the direction of the Z-axis, the electric displacement at the point $P(u,w)$ is given as follows, using the equations (1), (2), and (5):

$$D_w = \frac{9}{16} \cdot \frac{M_t}{b^2 h} \cdot \frac{d_{15}}{b} \left[1 - \left(\frac{u}{h}\right)^2\right] w \quad (6)$$

$$D_u = \frac{9}{16} \cdot \frac{M_t}{b^2 h} \cdot \frac{b d_{15}}{h^2} \left[1 - \left(\frac{w}{b}\right)^2\right] u \quad (7)$$

wherein $D_w$ and $D_u$ are the electric displacements in the direction of the U-axis and the W-axis, respectively.

Figure 15:
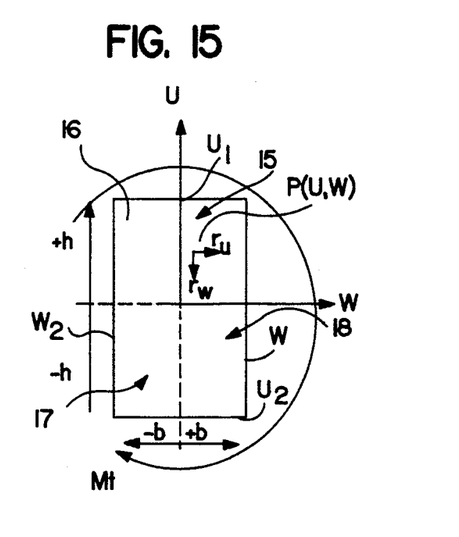

Meanwhile, as shown in the equations (1), (2), (6), and (7), and as illustrated in FIG. 15, respective shearing stress $\tau_w$, $\tau_u$ as well as respective electric displacement $D_w$, $D_u$ have mutually opposite polarity in the first and the third quadrants 15 and 17, and in the second and the fourth quadrants 16 and 18. This means that no electric displacement $D_w$ will arise and therefore no electric charge will be generated when the electrodes are formed along the entire surface of $u_1$ and $u_2$ in FIG. 15, which are perpendicular to the U-axis. Similarly, no electric charge will be generated when the electrodes are formed along the entire surfaces of $w_1$ and $w_2$, which are perpendicular to the direction of the W-axis.

In the embodiment according to the present invention shown in FIG. 5, support member 21 of tuning fork 7 by itself operates as a pickup member, and at least one pair of electrodes is provided on mutually opposite sides of the pickup member which are parallel to the Z-axis. Furthermore, at least one of this pair of electrodes is asymmetrically positioned on its supporting surface, i.e., off-center with respect to a center line on the surface that is parallel to the Z-axis so that electric charges may be generated through the appearance of electric displacement, e.g., at least one of the electrodes provided on the surface $w_1$, $w_2$ is positioned alongside the surface $u_1$ or $u_2$. More preferably, both electrodes are formed to one side of the surface $w_1$ or $w_2$ for the purpose of effective generation of electric displacement $D_u$.

The vibratory gyroscope shown in FIGS. 1 to 5 vibrates in the same manner as the one referred to in the prior art (FIG. 13). In other words, a Coriolis Force $F_c$ is exerted on the respective arm members 4 and 5 in opposite directions along the X-axis, when alternating currents are applied to the drive electrodes 11 and 12 to make the two arm members 4 and 5 vibrate symmetrically in the direction of the Y-axis. Accordingly, the thus-generated Coriolis Force $F_c$ makes the tuning fork 7 torsionally vibrate about the Z-axis with respect to the fixed plate 9. However, it should be noted that in the above-mentioned embodiments, it is the net torque $M_t$ acting on the pickup member 21 which is detected by itself for the purpose of obtaining the Coriolis Force $F_c$.

Figure 6:
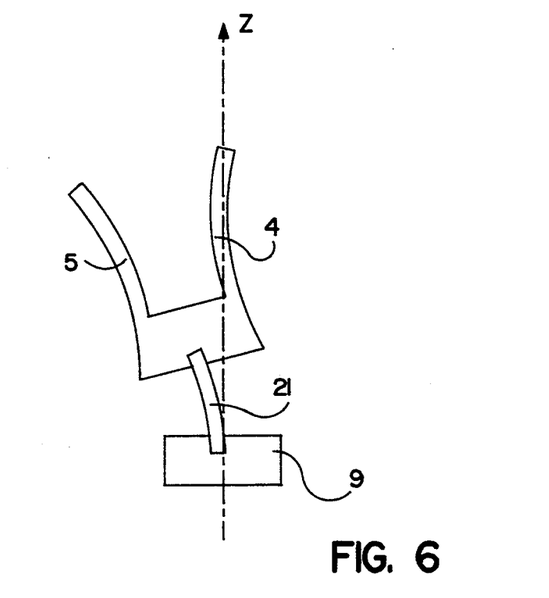
FIG. 6 is a front view of a vibratory gyroscope showing (greatly enlarged) the effect of an imbalance in the two arm members of the tuning fork.

In a conventional gyroscope, the existence of an imbalance in the weight and length of the two arm members 4 and 5 is liable to produce torsional vibration in the pickup member 21 as shown greatly enlarged in FIG. 6. On the other hand, since a gyroscope according to the present invention is in principle insensitive to the stress caused by flexural deformation as shown in equation (5), wider tolerances in the balancing of the weight and length of the arm members 4 and 5 can be accepted, so that the manufacturing process is simplified, particularly in case of mass production. Experiments have indicated that the pickup member 21 shown in FIG. 4 of the present invention lowered the offset level approximately 30 dB in comparison with a conventional pickup member in which bimorph elements are provided as shown in the prior art.

Furthermore, the gyroscope according to the present invention requires no separate pickup member protruding from the base member 6 in the direction of the X-axis. This not only sufficiently eliminates the space requirements in the direction of the X-axis so as to reduce the size of the whole device, but also simplifies the structure to effectively reduce the assembly process in the manufacture thereof.

Figure 7:
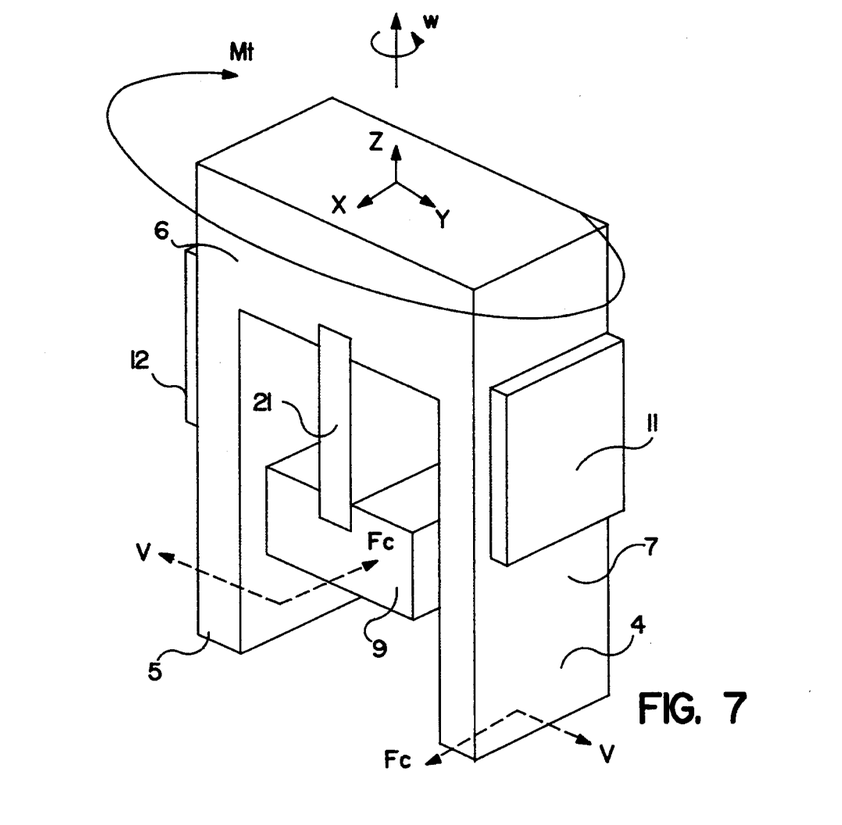
FIG. 7 is a perspective view of a second embodiment of a vibratory gyroscope according to the present invention.

FIG. 7 shows a perspective view of a further embodiment according to the present invention. In this embodiment, the tuning fork 7 has an upended configuration relative to the embodiments shown before and the pickup member 21 and the base plate 9 are positioned between the respective arm members 4 and 5, in order to reduce the space required by tuning fork 7 in the direction of the Z-axis. The pickup member 21 operates on the same principles as mentioned before and brings out the same effect as the embodiments mentioned hereinbefore.

Although each of the embodiments shown in FIGS. 1 and 7 comprises a pickup member 21 which also serves as a support member, the present invention may be made in a different manner in which a support member 8 is provided in the same manner as in the prior art, and a separate pickup member 21 made from piezoelectric material polarized in the direction of the Z-axis is fixed onto a side wall of the support member 8. With this construction, the piezoelectric material produces electric displacement in response to shearing stress in the direction of the U-axis or the W-axis, depending upon which surface of the support member 8, the pickup member 21 is affixed to, in accordance with the equation (5).

As mentioned before, the equation (5) means that no electric displacement arises and therefore no electric charge is generated in the electrode in response to shearing stress $\tau_w$ when the piezoelectric material is fixed along the entire surfaces $u_1$ and $u_2$, which are perpendicular to the U-axis. Similarly, no electric charge is generated in the electrodes in response to shearing stress $\tau_u$ when the piezoelectric material is fixed along the entire surfaces of $w_1$ and $w_2$, which are perpendicular to the W-axis. Accordingly, for generating electric displacements, a separate pickup member 21 made from piezoelectric material and polarized in the direction of the Z-axis should be:

(1) fixed on at least one of the surface $w_1$ or $w_2$ of a support member 8, while being positioned towards or alongside to the surface $u_1$ or $u_2$ or (2) fixed on at least one of the surface $u_1$ or $u_2$ of support member 8, while being positioned towards or alongside to the surface $w_1$ or $w_2$.

For the purpose of effectively generating electric displacements, the pickup member 21 is preferably fixed along a half-surface which is to one side of a vertical center line on one of the surfaces $w_1$ or $w_2$, or on one of the surfaces $u_1$ or $u_2$.

In the above-mentioned type of embodiment, fixing of the pickup member 21 to the support member 8 enhances mechanical durability of the pickup member, thereby protecting the pickup member from damage by mechanical shock.

Figure 8:
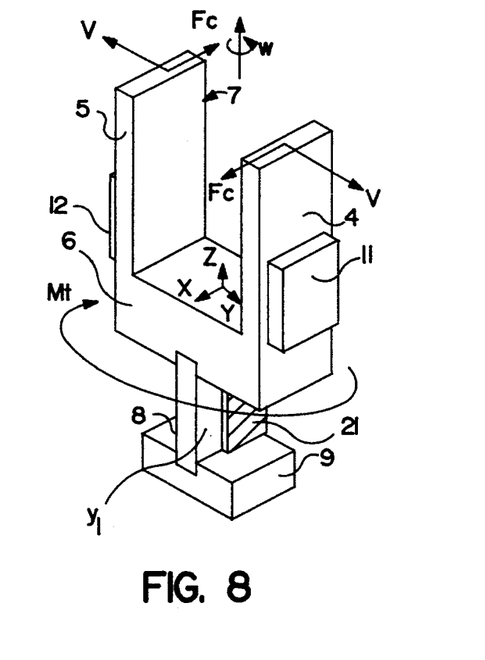
FIG. 8 is a perspective view of a third embodiment of a vibratory gyroscope according to the present invention.

In FIG. 8, the tuning fork 7 is constructed similar to that shown in FIG. 1, except that the support member 8 supports the tuning fork 7 on the base plate 9. In this embodiment, the pickup member 21 is fixed onto a surface $y_1$, which is perpendicular to the Y-axis, of the support member 8, while being positioned to one side in the direction of the X-axis. With this construction, the pickup member 21 detects the net torque $M_t$, arising from the Coriolis Force $F_c$ acting on the support member 8.

Figure 9:
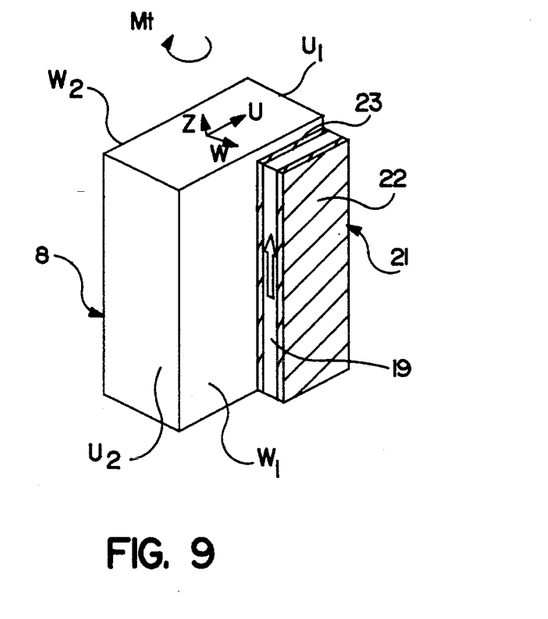
FIG. 9 is an illustration of a fifth embodiment of a pickup member for use in the vibratory gyroscope shown in FIG. 8.

As shown in FIG. 9 with a UWZ coordinate system, such a pickup member 21 may be made from a piezoelectric material of rectangular parallelopiped shape, being polarized in the direction of the Z-axis and having two electrodes 22 and 23 on the two opposite surfaces perpendicular to the W-axis. The pickup member 21 is fixed onto the surface $w_i$ perpendicular to the W-axis, of the support member 8, which is preferably made of resilient material while being positioned alongside to the surface $u_1$. Such disposition of the pickup member 21 causes the electrodes to generate electric charges in response to the shearing stress in the direction of the W-axis arising from net torque $M_t$ and acting on the support member 8. Accordingly, this enables the pickup member 21 to detect not torque $M_t$ acting on the support member 8 and arising from Coriolis Force $F_c$.

The gyroscope shown in FIG. 8 does not need to be formed monolithically from the two arm members 4 and 5, the base member 6, and the support member 3, but they may be of a mutually connected construction. Furthermore, the surface on which the pickup member 21 is to be fixed is not limited to the surface shown in FIGS. 8 and 9. For example, the pickup member 21 in FIG. 9 may be positioned alongside to the surface $u_2$, or instead of the pickup member 21 on $w_1$ or in addition thereto, a further pickup member may be fixed on the surface $w_2$, or two pickup members may be fixed mutually in parallel on each of surfaces $w_1$ and $w_2$. It will be understood that this kind of modification may also be applicable when the pickup member is fixed on the surface(s) $u_1$ and/or $u_2$.

Figure 10:
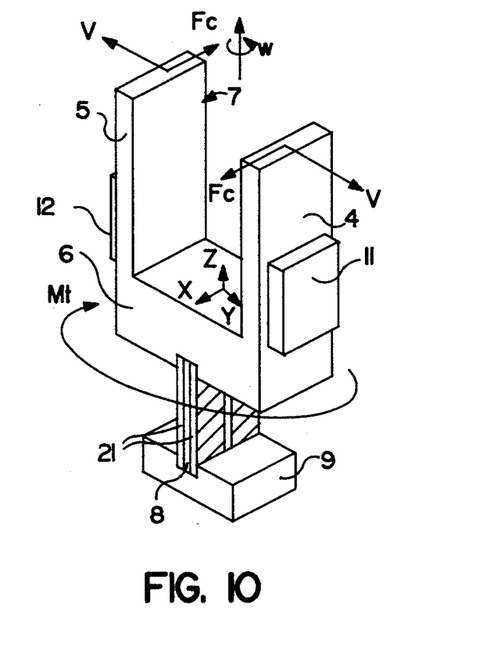
FIG. 10 is a perspective view of a fourth embodiment of a vibratory gyroscope according to the present invention.
Figure 11:
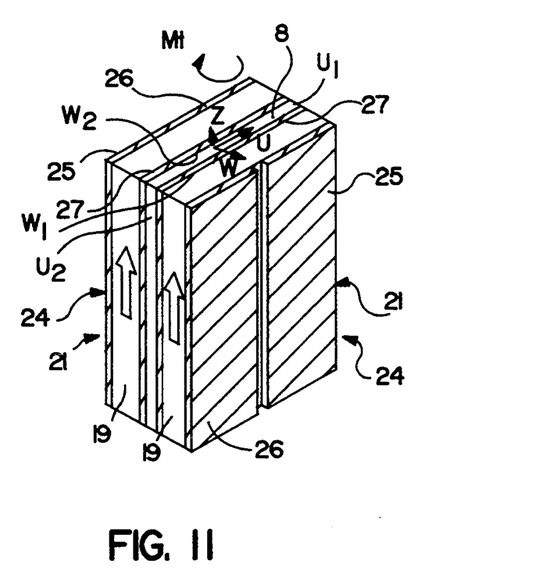
FIG. 11 is an illustration of a sixth embodiment of a pickup member for use in the vibratory gyroscope shown in FIG. 10.

FIG. 10 illustrates a further example according to the present invention. In this example, the support member 8 made from a plate-like material has two pickup members 21 on each surface perpendicular to the Y-axis. As shown in FIG. 11 with the UWZ coordination system, each pickup member 21 has a layer of piezoelectric material 19 extending in parallel with the support member 8 and is of substantially the same width as the support member 8. Each layer of piezoelectric material 19, which is polarized in the direction of the Z-axis, has two electrodes 24 and 27 respectively on each of its surfaces perpendicular to the W-axis, and one of each electrode 24 is divided into two small electrodes 25 and 26. The support member 8 is sandwiched between the two pickup members 21 on respective surface $w_1$ and $w_2$ of the supports perpendicular to the W-axis, and this construction is similar to a bimorph element in which two general types of piezoelectric elements hold a resilient plate therebetween. When the pickup member 21 shown in FIG. 11 is used in the gyroscope shown in FIG. 10, it operates in the same manner as that shown in FIG. 8.

In the embodiment shown in FIG. 11, two pairs of two small electrodes 25 and 26 positioned diagonally with respect to the support member 8 generate electric charges with mutually opposite polarity, in response to the action of the net torque $M_t$.

Alternatively, in the pickup member 21 shown in FIG. 11, only the electrodes 27 neighboring the support member 8 may be divided into two small electrodes, or both of the electrodes 24 and 27 may be divided in two electrodes.

Furthermore, a pickup member similar to that illustrated in FIG. 11 can be fixed on only one side of a surface of the support member 8 perpendicular to the W-axis, or the pickup member can be fixed on at least one of the surfaces $u_1$ and $u_2$ perpendicular to the U-axis in FIG. 11. In the latter case, the pickup member 21 generates electric charges in response to shearing stress $\tau_w$ applied in the direction of the U-axis.

Figure 12:
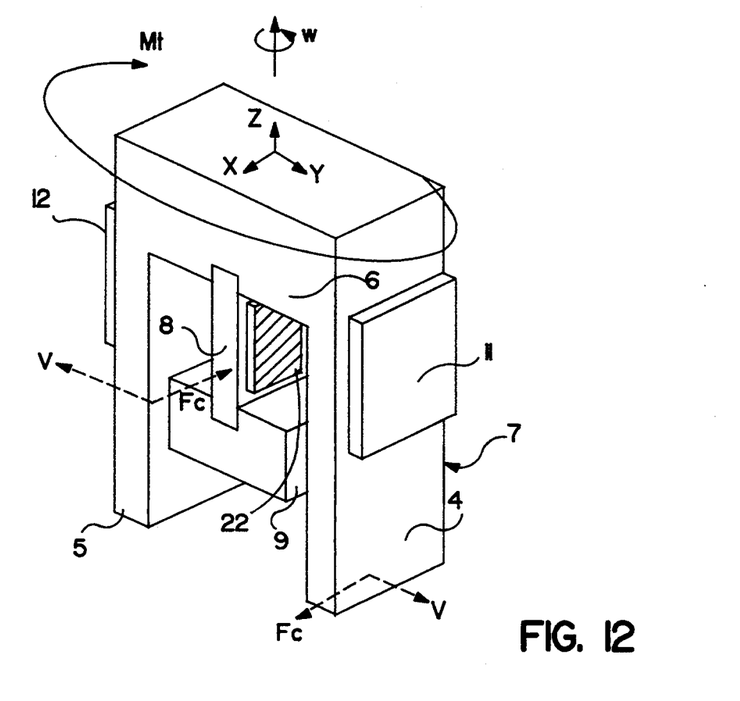
FIG. 12 is a perspective view of a fifth embodiment of a vibratory gyroscope according to the present invention.

FIG. 12 is a further embodiment according to the present invention, in which the tuning fork 7 is provided in an upended position, similar to that shown in FIG. 7, and the pickup member is fixed on a surface of the support member 8 extending between the two arm members.

While the invention has been described by reference to specific embodiments, this was for illustration only and should not be construed to limit the spirit or the scope of the invention. Numerous alternative embodiments will be apparent to those skilled in the art.

I claim:

1. A vibratory gyroscope comprising, with respect to an XYZ coordinate system, a tuning fork formed from a non-piezoelectric material having two arm members connected at ends thereof to a base member, said two arm members extending in parallel from said base member in the direction of the Z-axis and being separated from each other by a predetermined distance in the direction of the Y-axis, a pickup member comprising a body of piezoelectric ceramic material and extending from said base member in the direction of the Z-axis, said pickup member constituting a sole support member for said base member, said pickup member being polarized in the direction of the Z-axis, and at least a first pair of first and second electrodes disposed respectively on surfaces of said pickup member which are parallel to the Z-axis, at least said first electrode being asymmetrically positioned to one side of a center line on one of said surfaces, said center line being parallel to the Z-axis.

2. The vibratory gyroscope of claim 1 wherein said first and second electrodes are respectively disposed on first and second surfaces of said pickup member, said first and second surfaces being parallel to each other and to the Z-axis.

3. The vibratory gyroscope of claim 2 wherein said first electrode is disposed on said first surface adjacent to a third surface of said pickup member, said third surface being parallel to the Z-axis and perpendicular to said first surface.

4. The vibratory gyroscope of claim 2 wherein both said first and second electrodes are respectively positioned on said first and second surfaces to the same side of respective first and second center lines on said first and second surfaces, said first and second center lines being parallel to the Z-axis.

5. The vibratory gyroscope of claim 4 wherein said first electrode is positioned on said first surface adjacent to a third surface of said pickup member and said second electrode is positioned on said second surface adjacent to a fourth surface of said pickup member, said third and fourth surfaces being parallel to said Z-axis and perpendicular to said first and second surfaces.

6. The vibratory gyroscope of claim 4 further comprising a second pair of third and fourth electrodes disposed respectively on said first and second surfaces, said third and fourth electrodes being separated from said first and second electrodes respectively.

7. The vibratory gyroscope of claim 6 wherein said first and third electrodes substantially cover the entire first surface and said second and fourth electrodes substantially cover the entire second surface.

8. The vibratory gyroscope of claim 6 wherein said first and third electrodes are charged oppositely to each other, and said second and fourth electrodes are charged oppositely to each other.

9. The vibratory gyroscope of claim 6 wherein said first and third electrodes are separated from each other by a first groove in said piezoelectric material on said first surface, and said second and fourth electrodes are separated from each other by a second groove in said piezoelectric material on said second surface, said first and second grooves being parallel to the Z-axis.

10. A vibratory gyroscope comprising, with respect to an XYZ coordinate system, a tuning fork having two arm members connected at ends thereof to a base member, said two arm members extending in parallel from said base member in the direction of the Z-axis and being separated from each other by a predetermined distance in the direction of the Y-axis, a pickup member extending from said base member in the direction of the Z-axis, said pickup member constituting a support member for said base member, said pickup member including piezoelectric material polarized in the direction of the Z-axis, and at least a first pair of first and second electrodes disposed respectively on surfaces of said pickup member which are parallel to the Z-axis, at least said first electrode being asymmetrically positioned to one side of a center line on one of said surfaces, said center line being parallel to the Z-axis, wherein both said first and second electrodes are respectively positioned on said first and second surfaces to the same side of respective first and second center lines on said first and second surfaces, said first and second center lines being parallel to the Z-axis, said gyroscope further comprising a second pair of third and fourth electrodes disposed respectively on said first and second surfaces, said third and fourth electrodes being separated from said first and second electrodes respectively, wherein said pickup member comprises first and second pieces of piezoelectric material polarized in opposite directions of said Z-axis, said first and second pieces of piezoelectric material being aligned in parallel to each other so as to form said first and second surfaces of said pickup member, said first and third electrodes being disposed on said first surface and said second and fourth electrodes being disposed on said second surface, said first and third electrodes having the same charge, and said second and fourth electrodes having the same charge in response to the application of torque about the Z-axis.

11. The vibratory gyroscope of claim 1 wherein said pickup member extends from said base member in an opposite direction along the Z-axis as said two arm members.

12. The vibratory gyroscope of claim 1 wherein said pickup member extends from said base member in the same direction along the Z-axis as said two arm members and is located between said two arm members.

13. A vibratory gyroscope comprising, with respect to an XYZ coordinate system, a tuning fork formed from a non-piezoelectric material having two arm members connected at ends thereof to a base member, said two arm members extending in parallel from said base member in the direction of the Z-axis and being separated from each other by a predetermined distance in the direction of the Y-axis, a support member extending from said base member in the direction of the Z-axis, at least one separate pickup member disposed on a surface of said support member which is parallel to the Z-axis, said pickup member comprising a body of piezoelectric ceramic material polarized in the direction of the Z-axis, and at least a first pair of first and second electrodes disposed respectively on first and second surfaces of said pickup member which are parallel to the Z-axis, at least said first surface of said pickup member being attached to said surface of said support member at a position which is to one side of a center line on said support member surface, said center line being parallel to the Z-axis.

14. The vibratory gyroscope of claim 13 wherein said pickup member is attached to a surface of said support member which is perpendicular to the X-axis.

15. The vibratory gyroscope of claim 13 wherein said pickup member is attached to a surface of said support member which is perpendicular to the Y-axis.

16. The vibratory gyroscope of claim 13 comprising a first pickup member attached to a first surface of said support member and a second pickup member attached to a second surface of said support member, said first and second support member surfaces being parallel to the Z-axis.

17. The vibratory gyroscope of claim 16 wherein said first and second support member surfaces are parallel to each other.

18. The vibratory gyroscope of claim 13 wherein said support member extends from said base member in an opposite direction along the Z-axis as said two arm members.

19. The vibratory gyroscope of claim 13 wherein said support member extends from said base member in the same direction along the Z-axis as said two arm members and is located between said two arm members.

20. A vibratory gyroscope comprising, with respect to an XYZ coordinate system, a tuning fork having two arm members connected at ends thereof to a base member, said two arm members extending in parallel from said base member in the direction of the Z-axis and being separated from each other by a predetermined distance in the direction of the Y-axis, a support member extending from said base member in the direction of the Z-axis, at least one pickup member disposed on a first surface of said support member which is parallel to the Z-axis, said pickup member including piezoelectric material polarized in the direction of the Z-axis, and at least a first pair of first and second electrodes disposed respectively on first and second surfaces of said pickup member which are parallel to the Z-axis, said piezoelectric material having substantially the same width as said support member, at least said first electrode being divided into first and second portions by a line which is parallel to the Z-axis, one of said first and second electrodes being attached to said first surface of said support member.

21. The vibratory gyroscope of claim 20 comprising first and second pickup members attached to first and second surfaces respectively of said support member, said first and second support member surfaces being parallel to the Z-axis.

22. The vibratory gyroscope of claim 21 wherein said first and second support member surfaces are parallel to each other.

23. The vibratory gyroscope of claim 22 wherein each of said first and second pickup members includes a layer of piezoelectric material which is of a width substantially the same as that of said support member.

24. A vibratory gyroscope comprising, a tuning fork formed from a non-piezoelectric material and comprising two arm members extending from a base member in directions which are symmetric with respect to a central axis, a pickup member attached to said tuning fork and extending in the direction of said central axis, said pick-up member comprising a body of piezoelectric ceramic material polarized in the direction of the central axis, and having first and second surfaces oriented parallel to the central axis, and first and second electrodes which are disposed on said first and second surfaces, respectively, said first electrode being positioned with respect to the tuning fork so that it is located asymmetrically on one side of a center line which is parallel to the central axis, whereby said gyroscope does not exhibit a significant offset voltage in the absence of an angular velocity, wherein said pickup member serves as a sole support member for said base member and said first electrode is located asymmetrically on a first surface of said piezoelectric body to one side of a center line on said first surface, which center line is parallel to said central axis.

25. A vibratory gyroscope comprising, a tuning fork formed from a non-piezoelectric material and comprising two arm members extending from a base member in directions which are symmetric with respect to a central axis, a pickup member attached to said tuning fork and extending in the direction of said central axis, said pick-up member comprising a body of piezoelectric ceramic material polarized in the direction of the central axis, and having first and second surfaces oriented parallel to the central axis, and first and second electrodes which are disposed on said first and second surfaces, respectively, said first electrode being positioned with respect to the tuning fork so that it is located asymmetrically on one side of a center line which is parallel to the central axis, whereby said gyroscope does not exhibit a significant offset voltage in the absence of an angular velocity, wherein said tuning fork further comprises a support member extending from said base member, said pickup member being attached to a surface of said support member to one side of a center line on said support member surface which is parallel to the central axis.

* * * * *